United States Patent
Munson et al.

(10) Patent No.: US 7,636,901 B2
(45) Date of Patent: Dec. 22, 2009

(54) SYSTEM FOR INCREASING ACCURACY OF GEOCODE DATA

(75) Inventors: Daniel E. Munson, Boston, MA (US); Kenneth A. Munson, Old Lyme, CT (US); James M. Munson, Old Lyme, CT (US)

(73) Assignee: CDS Business Mapping, LLC, Boston, MA (US)

( * ) Notice: Subject to any disclaimer, the term of this patent is extended or adjusted under 35 U.S.C. 154(b) by 547 days.

(21) Appl. No.: 10/877,060

(22) Filed: Jun. 25, 2004

(65) Prior Publication Data

US 2005/0034074 A1 Feb. 10, 2005

Related U.S. Application Data

(60) Provisional application No. 60/484,622, filed on Jun. 27, 2003.

(51) Int. Cl.
*G06F 3/048* (2006.01)
*G06F 3/01* (2006.01)

(52) U.S. Cl. .............. 715/855; 715/790; 715/799; 715/818; 715/823; 715/851

(58) Field of Classification Search ............... 715/790, 715/799, 818, 823, 825, 851, 855
See application file for complete search history.

(56) References Cited

U.S. PATENT DOCUMENTS

| | | | | |
|---|---|---|---|---|
| 5,794,178 A * | 8/1998 | Caid et al. | ...................... | 704/9 |
| 6,101,496 A * | 8/2000 | Esposito | ........................ | 707/6 |
| 6,552,670 B2 | 4/2003 | Sundaravel et al. | | |
| 6,631,326 B1 | 10/2003 | Howard et al. | | |
| 6,658,356 B2 * | 12/2003 | Chen et al. | ...................... | 702/5 |
| 6,678,615 B2 * | 1/2004 | Howard et al. | .................. | 702/5 |
| 7,031,959 B2 * | 4/2006 | Garner et al. | ................... | 707/3 |
| 7,039,640 B2 * | 5/2006 | Miller et al. | ................... | 707/10 |
| 7,076,452 B2 * | 7/2006 | Florance et al. | ............... | 705/26 |
| 7,085,650 B2 * | 8/2006 | Anderson | ....................... | 702/2 |
| 7,171,389 B2 * | 1/2007 | Harrison | ....................... | 705/51 |
| 2001/0026270 A1 | 10/2001 | Higgins et al. | | |
| 2001/0026271 A1 | 10/2001 | Higgins et al. | | |
| 2001/0028348 A1 | 10/2001 | Higgins et al. | | |
| 2001/0033290 A1 | 10/2001 | Scott et al. | | |
| 2001/0033291 A1 | 10/2001 | Scott et al. | | |
| 2001/0033292 A1 | 10/2001 | Scott et al. | | |
| 2002/0124015 A1 * | 9/2002 | Cardno et al. | ............... | 707/204 |
| 2003/0052896 A1 | 3/2003 | Higgins et al. | | |
| 2003/0225725 A1 | 12/2003 | Miller et al. | | |
| 2004/0078143 A1 * | 4/2004 | Howard et al. | .................. | 702/5 |
| 2004/0138817 A1 * | 7/2004 | Zoken et al. | .................... | 702/5 |
| 2006/0125828 A1 * | 6/2006 | Harrison et al. | ............. | 345/441 |
| 2006/1012582 * | 6/2006 | Harrison et al. | ............. | 345/441 |

* cited by examiner

*Primary Examiner*—Weilun Lo
*Assistant Examiner*—Nicholas Augustine
(74) *Attorney, Agent, or Firm*—Hamilton, Brook, Smith & Reynolds, P.C.

(57) ABSTRACT

A mapping system uses aerial photographs to correct geocode data for street addresses. After entering an address, a street map is displayed along with an aerial photo, both of which indicate the street address location based on standard algorithms. The indicator on the aerial map can be moved to accurately align with the location of the entered street address, which corrects the geocode data, allowing further geographical analysis to be performed using the corrected geocode data. The corrected geocode data can be used to more accurately determine distances from the property at the street address to natural hazards such as, coastlines, earthquake faults and flood zones.

26 Claims, 6 Drawing Sheets

Policy Number: ⬜—400

Street: ⬜—402

City: ⬜—404   State: ⬜—406

Zip Code: ⬜—408

[Submit]—410

FIG. 4

SYSTEM FOR INCREASING ACCURACY OF GEOCODE DATA

RELATED APPLICATIONS

This application claims the benefit of U.S. Provisional Application No. 60/484,622, filed on Jun. 27, 2003. The entire teachings of the above application are incorporated herein by reference.

BACKGROUND

TIGER, a registered trademark of the United States Census Bureau, is a digital database that defines the location and relationship of streets, rivers and other features in the United States to each other. The term TIGER is derived from the acronym Topologically Integrated Geographic Encoding and Referencing. Publicly available TIGER/line files created from the TIGER database include geographic location (latitude/longitude), name and ranges for assigned street addresses for streets/roads in the United States.

Geographic Information System (GIS) software imports TIGER/Line files and uses the information about the relationship between geographic features to produce a map. The map that can be produced from the TIGER/Line files range from a neighborhood street map to a map of the United States.

As the TIGER/Lines files only provide geographical co-ordinates for the endpoints and address ranges for the street segment, the GIS software assumes that each lot or property parcel, that is, each measured parcel of land having fixed boundaries and designated on a plot of survey, on the street segment is the same width. Also, the TIGER/Lines files are only designed to show relative position of elements. Additionally, the address range for a street segment may be incorrect. Thus, the location of the street address may be incorrectly identified blocks from the actual location. The GIS software also assumes that a building on each lot on the street is the same distance from the street/road, and that the building is located in the center of the lot. In campus settings, or with irregular sized or shaped lots this is simply not the case.

However, even with the inaccuracy in location of the street address, the TIGER/Lines file is useful for creating maps that do not require a high level of positional accuracy. For example, a TIGER/Lines file is typically used by applications to provide driving directions between two street addresses or to display the location of property offered for sale.

The TIGER/Lines file can also be used by risk analysis applications. Risk analysis applications are typically used by property insurance underwriters in the insurance industry for generating geographical reports regarding distances from a building to natural hazards such as coastlines, earthquake faults and flood zones.

However, as the source of the much of the data is 1:100,000 scale maps from the United States Geological Survey (USGS) the accuracy is approximately +/−167 feet. Flood zones are irregular and follow a river. Typically, flood risk is determined by whether a building is within 250 feet of a flood plain, thus an error of +/−167 feet in the location of a building is significant.

In the case of a risk management application, the inaccuracies in the database may be critical. For example, the insurance premium is higher if a building is within 250 feet of a flood zone. Thus, the distance from the building to the flood zone is important for both the insurer and the insured. For example, an inaccuracy in position of the building of 50 feet could result in a different, and perhaps significantly higher or lower price for flood insurance. In addition, in the case of a flood claim, the property insurance underwriter that made the incorrect assessment could be liable for the entire value of the building.

Furthermore, the TIGER/Line files do not include every street in the United States. In many cases, this is because a street came into existence after the database was created. Additionally, many street segments are not associated with a name. Thus, the TIGER/Lines files cannot be used by GIS software to locate a street address on an unnamed street.

SUMMARY

Prior to the availability of the TIGER/lines database, risk management assessments required time-consuming travel to physically view the location of the property at the street address. With the availability of the TIGER/lines files and other commercially available databases (street files), the need to physically view the location of the property is greatly reduced. However, physical viewing of the location of the property is still required to resolve disputes regarding the location of a street address on a street due to the inaccuracy of the database, the interpolation of the known geographic co-ordinates and for unnamed streets.

The need for physically viewing the location of the property at the street address is further reduced through the use of aerial photographs. However, although the correct location can be identified in the aerial photographs, the distance to natural hazards such as a flood zone is based on the incorrect geographic location computed based on information stored in the streets file.

In the Applicants' invention, geographic co-ordinates (geocode data) for a street address are corrected interactively through the use of a user interface that displays a georeferenced image of the geographic area represented by the map.

A method in accordance with embodiments of the invention interactively computes geographical coordinates corresponding to a street address. A map representing a geographical area that includes an indication of the location of the street address is displayed on a screen of a display device. A geo-referenced image of the geographical area is also displayed on the screen. Upon selection of a corrected location of the street address in the geo-referenced image, geographic co-ordinates of the corrected location are computed and the map is redrawn based on the computed geographic co-ordinates. An indication of the corrected location of the street address is displayed in the redrawn map at the computed geographic co-ordinates. An indication of the corrected location of the street address may also be displayed in the georeferenced image The geographical co-ordinates may be computed by converting the location of the selected pixel in the geo-referenced image into the corrected geographic co-ordinates. Geographical analysis may be performed using the computed geographic co-ordinates. The geographical analysis performed may be the distance of the street address to a natural hazard such as a flood zone.

The georeferenced image may be displayed beside the map or the map may be overlaid on top of the georeferenced image. The georeferenced image may be an aerial photograph, a satellite image, a parcel map or a scaled topographical map.

BRIEF DESCRIPTION OF THE DRAWINGS

The foregoing and other objects, features and advantages of the system for increasing accuracy of geocode data will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates a display image displayed by the display in the client allowing the user to enter a request for displaying a location of a street address;

DETAILED DESCRIPTION OF THE INVENTION

Figure 1:
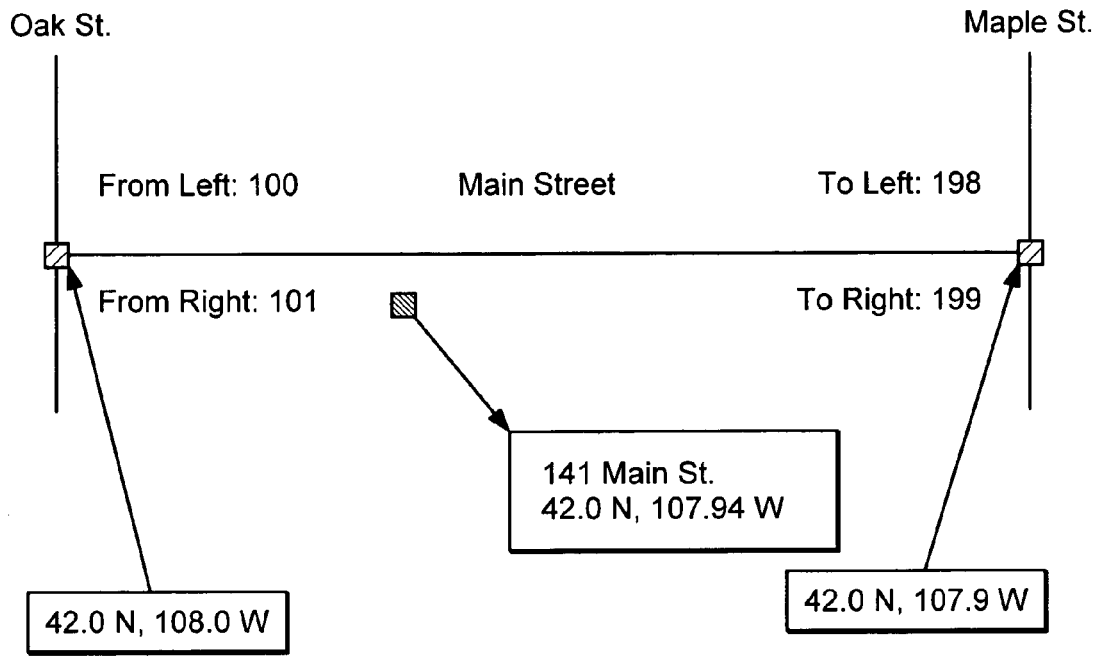
FIG. 1 is an example of a neighborhood street map generated by prior art GIS software.

FIG. 1 is an example of a neighborhood street map generated by prior art GIS software. As shown, a street segment named "Main Street" intersects with Oak Street at the left end of Main Street and with Maple Street at the right end of Main Street. The geographic locations of the endpoints of Main Street are stored in the TIGER/Lines files, that is, the intersection with Oak Street at 42.0 N, 108.0 W and the intersection with Maple Street at 42.0 N, 107.9 W. The street address ranges for each side of Main Street are also stored in the TIGER/Lines files. As shown, the address range on one side of the street segment is even numbers from 2 to 198 and the address range on the other side of the street segment is odd numbers from 1 to 199.

To identify the location of a street address on the street, the GIS software interpolates geographic coordinates (latitude/longitude) for the end points of the street segment that are stored in the TIGER/Lines database. This process is commonly referred to as geocoding and the result is geocode data for the street address. In the example shown, the GIS software retrieves geographic coordinates stored in the database for the endpoints of street segment (Main Street). These geographic coordinates are used to identify the location of 141 Main Street. To determine the geographic co-ordinates of 141 Main Street, the GIS software interpolates the geographic co-ordinates of the endpoints along Main Street. After the interpolation of the endpoints, the location of 141 Main Street is shown on the map at 42.0 N, 107.84 W.

Because the geocode data is derived from assumed values and extrapolations from their values, actual positions of lots and buildings frequently differ from the TIGER data.

Figure 2:
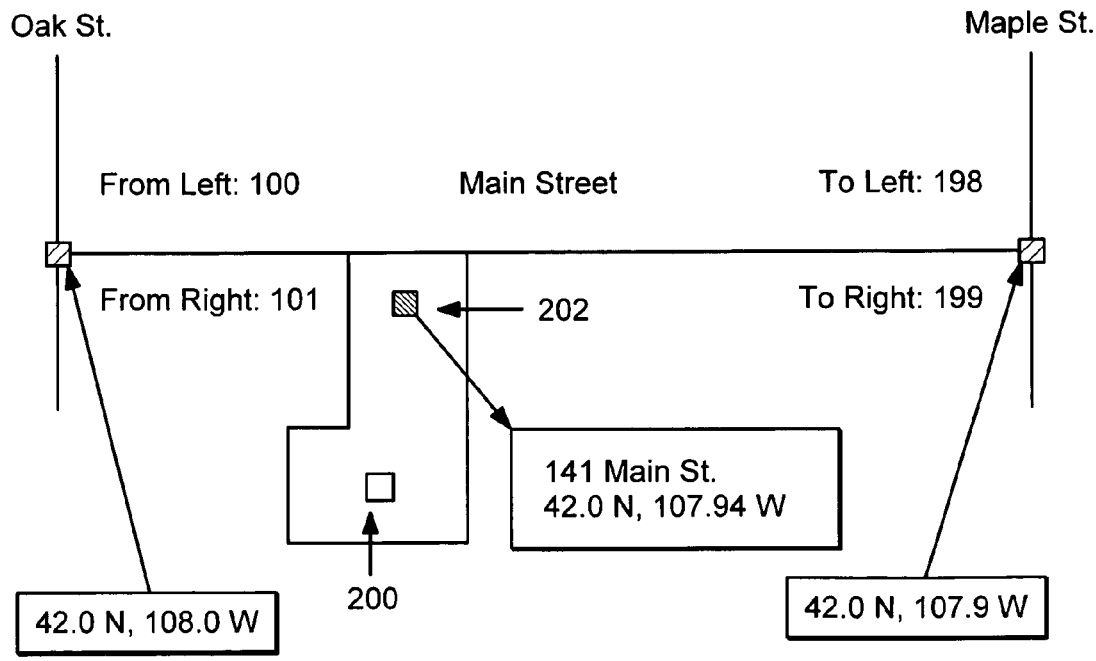
FIG. 2 illustrates an irregular shaped lot on the street segment shown in FIG. 1.

FIG. 2 illustrates an irregular shaped lot on the street segment shown in FIG. 1. As shown, the lot has a narrow driveway extending to the building at location 200 which is further from the centerline of the street than the location 202 computed by the GIS software. It is a goal of the system to correct the geocode data/map to reflect actual physical locations of lots or property parcels, that is, each measured parcel of land having fixed boundaries and designated on a plot of survey properties.

Figure 3:
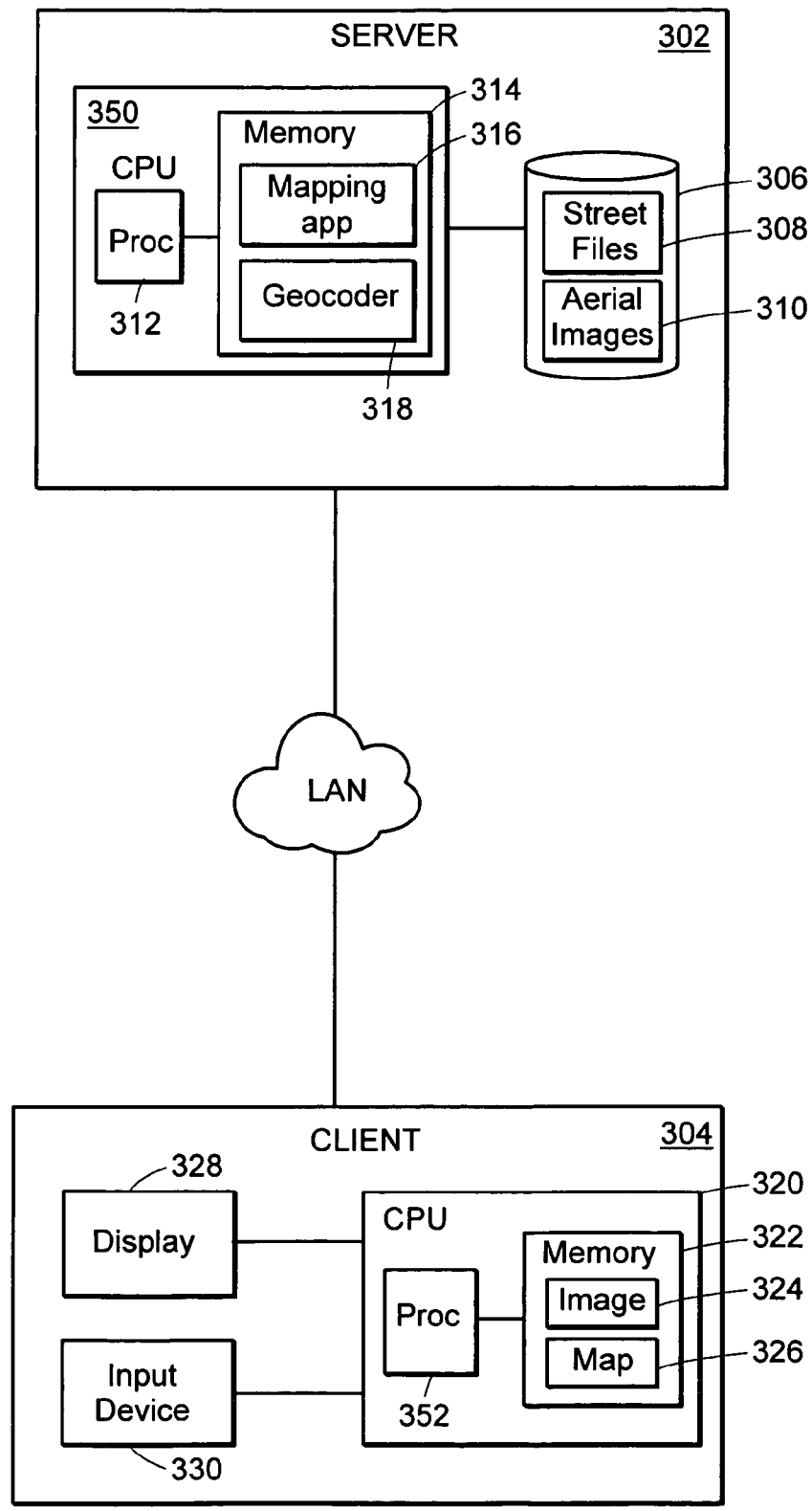
FIG. 3 is a block diagram of a system including a geographic information system according to the principles of the present invention.

FIG. 3 is a block diagram of a geographic information system according to the principles of the present invention. A geographical information system is an application for viewing and creating maps. Generally, a geographic information system includes a viewing system, an environment for creating maps and a server for managing maps and data for real-time on line viewing. In the embodiment shown, the geographic information system is implemented in a client/server architecture. A client 304 and server 302 that are coupled to a Local Area Network (LAN) work together to provide a geographic information system application, with the application split between the "front end" client and the "back-end" server. The client portion of the application is typically optimized for user interaction and the server portion provides multi-user functionality. The client can be a personal computer. The server can be a personal computer, minicomputer or mainframe.

The server 302 includes a Central Processing Unit (CPU) 350 which includes a processor 312 and memory 314. A mapping application 316 and geocoder 318 are stored in the memory and executed by the processor 312. A storage device 306 in the server 302 stores street files 308 and aerial images 310. The street files 308 can be TIGER/Lines files publicly available from the United States Census Bureau or commercially available "enhanced TIGER" files or any other database that includes street information.

The client 304 includes a Central Processing Unit (CPU) 320 that includes a processor 352 and memory 322. The memory stores an image 324 and map 326 for display on a screen of a display device 328. The client also includes an input device 330.

The mapping software 316 in the server 302 uses the street files 308 to generate a map in response to a request received from the client 304 for a map displaying the geographic location of a street address. The geographic area represented by the map is based on the geographic location of the street address; that is, the geographic area extends from the location of the street address which is placed in the center of the map. The geocoder 318 in the server 302 computes geocode data (geographic co-ordinates) for the street address based on data stored in the street files 308 using a process commonly referred to as geocoding. Geocoding is the process of determining the geographic coordinates of a location from a street address. The mapping software 316 takes the determined geocode data and creates a map 326 centered on the geocode data. The mapping software uses the determined geocode data to identify the location of the street address on the map.

The server also retrieves a georereferenced aerial image of the same area represented by the map from the stored aerial images 310. An aerial photograph is skewed due to perspective and elevation effects and is converted to a image without skew using a process commonly referred to as "rubber sheeting" because the image is stretched like a sheet of rubber. In addition, the image is georeferenced by registering points in the image with "control points" on the ground. Control points are points on the ground with known geographical coordinates. For example, a control point may be a street intersection for which geographical coordinates are available from a streets file or from a Global Positioning System. These control points can be identified in the photograph and a georeferenced image is generated from the photograph by 'bending' the photograph to match the points in the photograph with the geographical coordinates to eliminate the skew.

The georeferenced aerial image, map and geocode data are transmitted to the client. The client stores the map 326 and corresponding image 324 in memory for display on screen of the display device 328. In the embodiment shown, aerial images are stored in the server. In alternative embodiments, the aerial images can be retrieved over the Internet.

FIG. 4 illustrates a display image displayed by the display in the client that allows the user to enter a request to display a map indicating the location of a street address. A user on the client can enter a request for a map indicating the location of a street address, city, zip code, state or the location of property covered by a particular insurance policy by entering the information into fields 400, 402, 404, 406, 408 in the display image. After the information has been entered into one or more fields, the user submits the request by selecting a button 410 labeled "submit". In the client/server implementation described in conjunction with FIG. 3, a request for a location based on the entered information is formulated by the client 304 and transmitted to the server 302 for processing by the mapping software 316.

Figure 5:
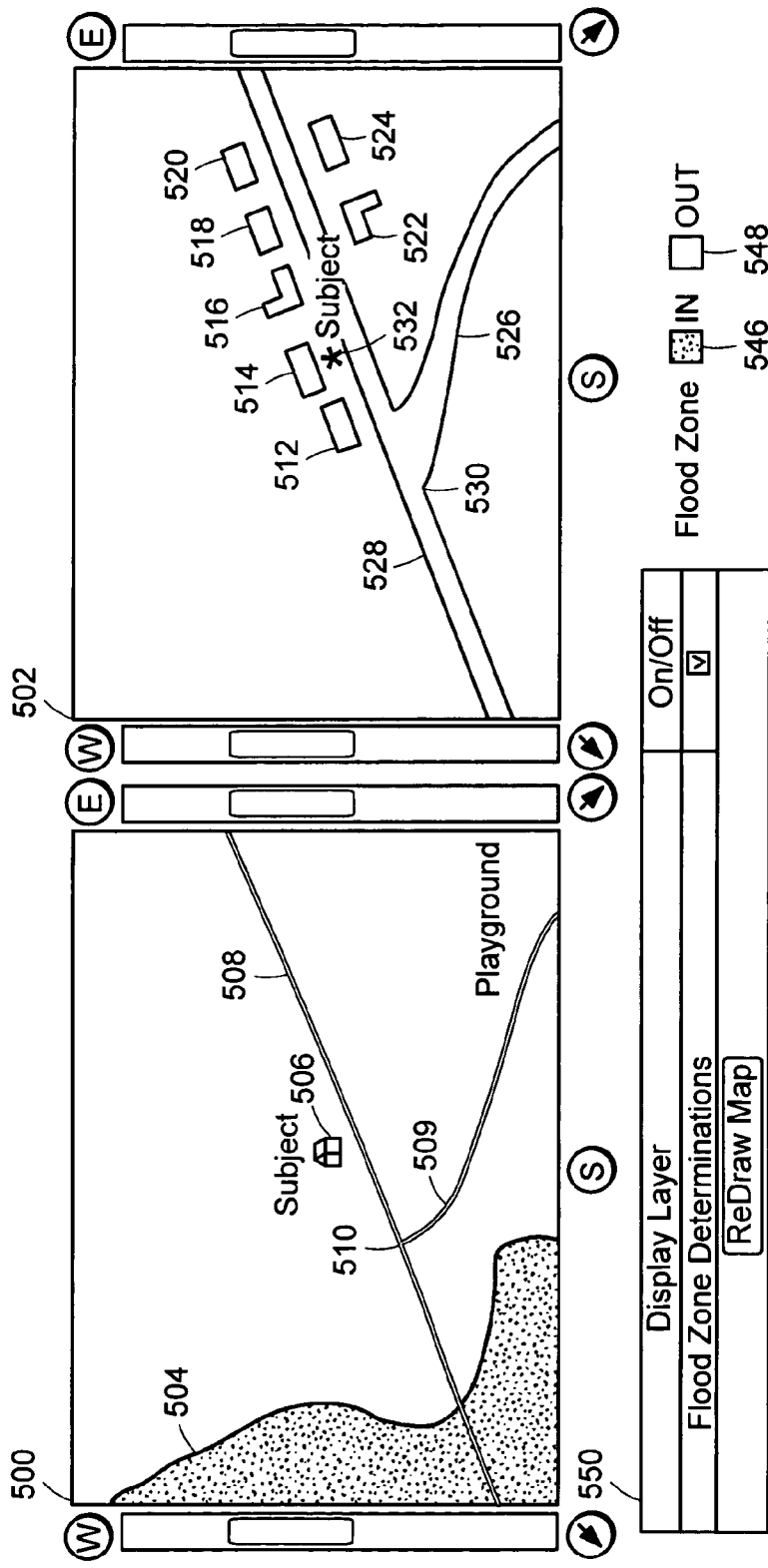
FIG. 5 illustrates a display image displayed on a screen by the client illustrating the result of the request for identifying a location returned by the server.

FIG. 5 illustrates a display image displayed on a screen by the client illustrating the result of the request for identifying a location returned by the server. FIG. 5 is described in conjunction with FIG. 3. The display image displays a map 500 generated by the mapping software 316 in the server 302 and stored in memory in the client. The map is generated based on a request for the location of a street 318 entered by the user as described in conjunction with FIG. 4. The geocoder software 318 in the server 302 uses information stored in the street files 306 to compute geocode data for the location of the street address on the street. With the computed geocode, mapping software creates a map is with the geocode data at the center of the map. The location of the street address based on the computed geocode data is indicated by building symbol 506 in the map 500. The text "subject" is also displayed above the building symbol 506. A geocoded image 502 covering the same geographical area as the map 500 is also displayed. The location identified by the computed geocoded data is indicated by star symbol 523.

In the embodiment shown, the image 502 and the map 500 are displayed side-by-side in the display image on the screen of the display device. In an alternate embodiment, the image 502 can be displayed above or below the map 500 in the display image.

The geographic area represented by the map and shown in the aerial image can be modified through the use of radio buttons 534, 536 labeled "Zoom In" and "Zoom Out". Methods for rescaling an image for display on a screen are well-known to those skilled in the art and beyond the scope of the present invention.

In the embodiment shown, flood zone determination is selected as indicated by the checkmark displayed in the Flood Zone Determinations field 550 and the map displays the boundary of a flood zone 504. The house symbol 506 indicating the location of a building associated with the street address is shown as being located within a distance from the flood zone boundary that is considered to be within the flood zone as indicated by flood zone field 546 labeled "IN".

By displaying both the georeferenced aerial image corresponding to the geographic area represented by the map and the map showing the streets, the geographic location of the building represented by the house symbol 506 on the map can be more accurately determined.

Another radio button labeled "Manual Placement" allows the computed geocode data for the street address to be corrected by selecting a building in the aerial image that corresponds to the street address. The building in the aerial image can be selected through the use of a user input device, such as a mouse.

For example, in the aerial image, the location of the street address may be incorrectly identified as building 514, the second building from street junction 530 based on the geocode data determined from the data stored in the street files. However, the correct building may be building 516, the third building from street junction 530. As building 516 is further from the flood zone 504 than building 514, this may affect the flood zone determination.

To correct the location of the building, the user selects the Manual Placement Tool by selecting radio button 540 and moves a cursor to select another location in the aerial image. For example, to select building 516, an input device, such as a mouse is moved to move a cursor on top of building 516 in the aerial image. This corrected location is selected by "clicking the mouse", that is pressing and releasing a button on the mouse. The geocode data for the selected location (pixel) in the aerial image is computed. The corrected geocode data replaces the geocode data for the street address based on information in the street address files and provides more accurate geocode data for the street address. This more accurate geocode data is used to redraw the map in which the corrected location of the street address is shown. The flood zone determination can be re-computed based on the more accurate geocode data.

Figure 6:
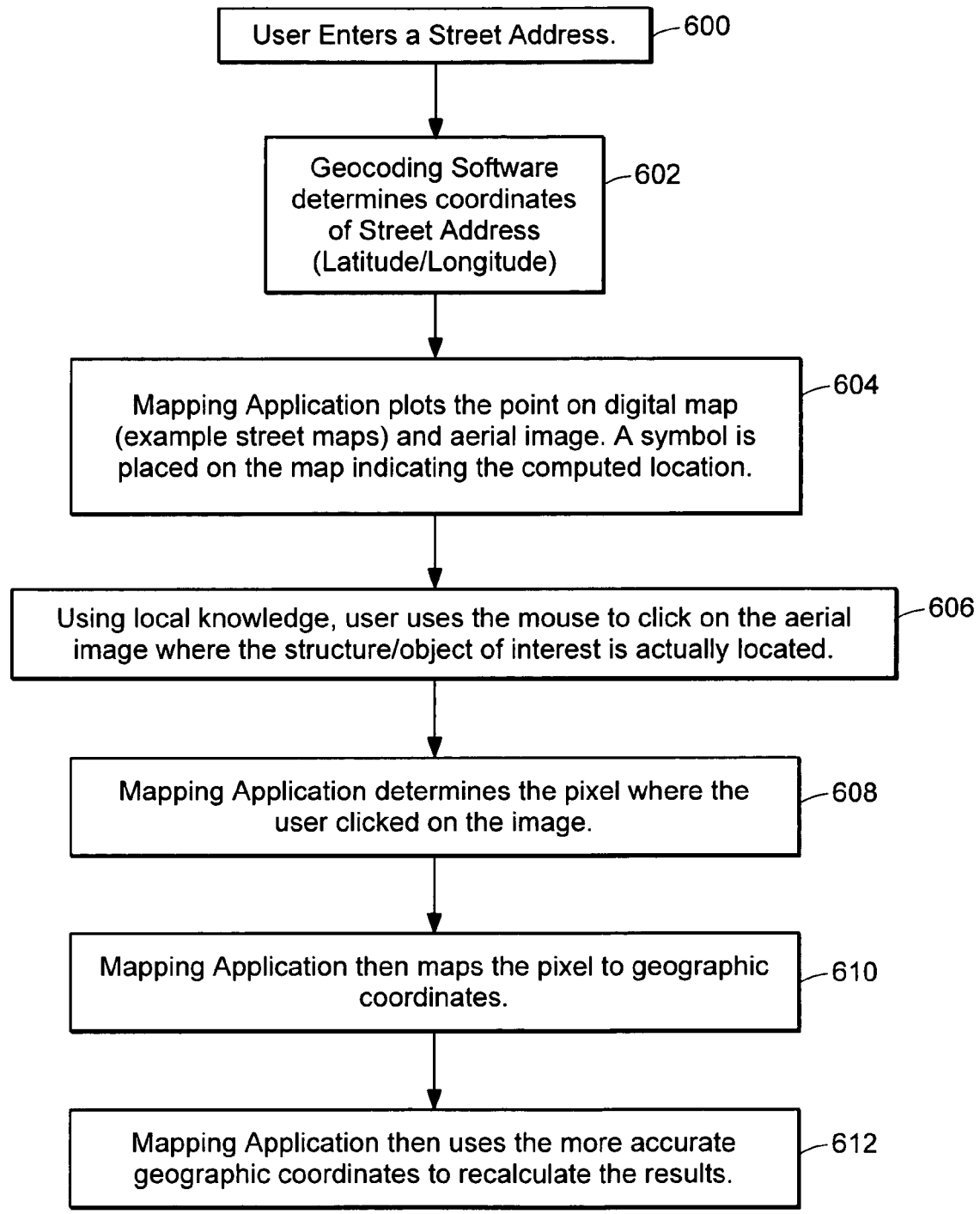
FIG. 6 is a flowchart illustrating a method for providing more accurate geocode data according to the principles of the present invention.

FIG. 6 is a flowchart illustrating a method for providing more accurate geocode data according to the principles of the present invention. FIG. 6 will be described in conjunction with FIGS. 3-5.

At step 500, a user of an application is prompted to enter a street address as shown and described in conjunction with FIG. 4. After the user has entered the street address, the user indicates completion by selecting a button on the display labeled "submit" 410.

At step 602, based on the entered street address, a geocoder 318 (FIG. 3) retrieves information from a streets file and determines the geocode data (latitude and longitude) for the street address. The geographic locations of the endpoints of the street are stored in the streets files (database) along with the range of numbers for the street. To identify the location of a street address on the street, the geocoder interpolates geographic coordinates (latitude/longitude) retrieved from the streets database for the endpoints of the street address along the street address. As the streets database only provides geographical co-ordinates for the endpoints and address ranges for the street segment, the mapping software 316 (FIG. 3) assumes that each lot or property parcel, that is, each measured parcel of land having fixed boundaries and designated on a plot of survey, on the street segment is the same width. The mapping software 316 also assumes that the building on each lot on the street is the same distance from center of the street/road, and that the building is located in the center of the lot. Based on the interpolation, the geocoder 318 assigns geocode data to the street address.

At step 604, based on the geocode data computed for the street address, a mapping application creates a map of a geographical area around the computed location, with the computed location being in the center of the map. The map is displayed in the display image on the screen of the display device as shown in FIG. 5. A building symbol 506 is displayed on the map in the location corresponding to the computed geocode data. The mapping software (application) retrieves a georeferenced aerial image from the stored aerial images 310 for the same geographical area represented by the map and transmits the aerial image for display by the client on the screen of the display device as shown in FIG. 4. A star symbol 532 representing the computed geocoded is overlaid on top of the aerial image to indicate the location of the computed geocode.

At step 606, both the map which may be overlaid with other geographical information, such as, natural hazards, for example, flood zones and earthquake zones and the aerial image are displayed on the screen of the display device. The map provides distance from the building at the street address to natural hazards, such as flood zones. The aerial image allows the user to visualize the location of the building represented in the map. Due to inaccuracies in the streets database used to produce the map, the location of the building at the street address may be incorrectly represented in the map. As the location identified by the computed geocode data is also identified in the georeferenced aerial image, the user can quickly determine if the identified location is correct. If the identified location is incorrect, the user can select the correct building in the aerial image by selecting the correct building directly on the georeferenced aerial image using a user input device. For example, when the user input device is a mouse, as the mouse is moved on a surface, such as a desktop a cursor (an on-screen icon) moves on the screen with movements of the mouse. The mouse can be a mechanical mouse, an optical mouse or an optomechanical mouse or any other type of mouse. After the on-screen cursor has been moved to the correct location in the aerial image, the user presses a button on the mouse to produce a "mouse click" which results in selecting the current location of the cursor in the aerial image displayed on the screen of the display device.

At step 608, notification of the "mouse click" is received by the mapping application. The mapping application determines the x, y display screen co-ordinates of the selected location in the aerial image provided by the "mouse click" event. The x, y display screen co-ordinates map to a pixel (picture (pix) element), that is, the smallest element in the displayed image.

At step 610, the mapping application determines the geographic coordinates that map to the identified pixel. Geographical coordinates are known for at least two opposite corners of the georeferenced aerial image. Thus, knowing the dimension of the image in pixels and the location of the selected pixel, geographical coordinates for the selected pixel in the aerial image can be computed using the known geographical coordinates. These computed geographical co-ordinates for the selected pixel are the corrected geocode data for the street address.

At step 612, the mapping application uses the corrected geocode data to create a map with the corrected geocode in the center of the map. The location of the corrected street address is indicated in the map. An aerial image covering the same geographic area represented by the map is retrieved and displayed on the screen of the display image. The corrected geocode data is then used for further geographic analysis, for example, to compute risk factors associated with the street address, such as, distance from flood zone.

Figure 7:
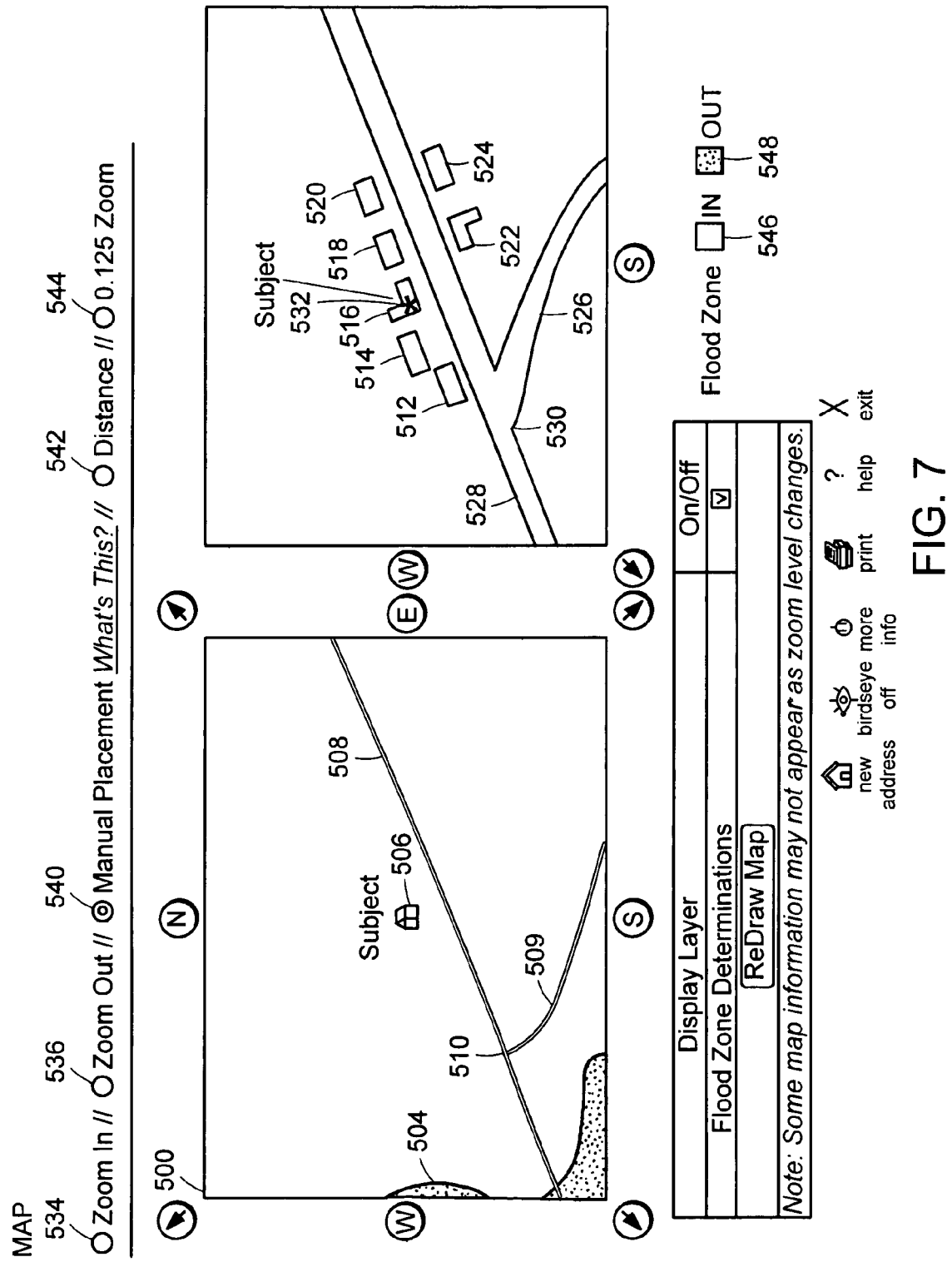
FIG. 7 illustrates the display screen, after the mapping software has regenerated the map based on the corrected geocode data for the building.

FIG. 7 illustrates the display screen, after the mapping software has created the map based on the corrected geocode data for the building. The building symbol 506 is displayed in the center of the map at the location identified by the corrected geocode data. A star symbol 532 overlaid on top of building 516 identifies building 516 in the aerial image corresponding to the corrected geocode data.

This corrected geographical location (geocode data) of the building at the street address is used to perform future geographic queries. As shown in FIG. 6, the placement of the building has changed based on the corrected geocode data. In the case of the flood zone, the distance of the flood zone to the corrected geographical location has been recomputed and displayed. Based on the corrected geocode data, the flood zone further from the building, and the risk of the flood has changed to low. The location identified by the corrected geocode data is outside of the flood zone as indicated by the selection of field 548 labeled "OUT".

As discussed, the system provides interactive feedback allowing a location corresponding to a street address to be corrected and corresponding geographic queries to be rerun using the corrected geographic location. The geographical location is computed automatically based on a "click" of a mouse on an aerial image indicating the corrected location. By allowing the user to select the correct location on the map, any positional error in the map can be corrected quickly. Thus, accurate geographic queries can be performed quickly. Additionally, the geographical information system can use the corrected geographical location to automatically make a more accurate determination or to obtain a more accurate answer to any further geospatial queries.

The invention has been described for an embodiment in which aerial photographs are used to correct the location of the street address, in an alternate embodiment satellite images or any other geo-referenced figure or drawing can be used instead of an aerial image. The drawing can be a parcel map, topographical map or any other map that is drawn to scale and georeferenced. Although the invention has been described for an embodiment in which a street address is used to initially determine the geographic area, in an alternative embodiment, the postal code also referred to as a ZIP (Zone Improvement Program) code in the United States, or a city or state can be used as the initial geocode data to select the geographic area in which the street address is located. When using a ZIP code to provide a geographic area, the location of the building is positioned initially in the geographic center of the ZIP code area. In many cases, this approximation of the geographic location is adequate and the correct location can be determined by zooming in to the street address on the map and viewing the corresponding aerial image.

In yet another embodiment, the initial geographic area represented by the map can be selected by requesting a map centered on a landmark. For example, to find a building on an unknown street close to a well-known monument, the geographic area can be selected based on the geographical location of the monument provided by the streets file. By displaying the map centered on the monument and the aerial image of the geographical area represented by the map, the location of the building can be easily identified and the street address retrieved for the identified building.

In the embodiment of the user interface shown in FIGS. 5 and 7, the map and the aerial image are displayed side-by-side. In an alternate embodiment, the map and aerial image can be combined by overlaying the map on top of the aerial image.

The invention has been described for risk analysis based on flood zones. However, the invention is not limited to flood zones or risk analysis. The invention can be used for any application that requires accurate geographical location information.

Those of ordinary skill in the art should recognize that methods involved in a system for increasing accuracy of geocode data may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to particular embodiments, it will be understood by those skilled in the art that various changes in form and details may be made without departing from the scope of the invention encompassed by the appended claims.

What is claimed is:

1. A computer implemented method for interactively modifying geographic coordinates corresponding to a street address comprising:
   displaying a map representing a geographical area that includes an indication of the location of the street address;
   displaying a geo-referenced image of the geographical area;
   upon selection of a control accepting manual selection by a user of a corrected location of the street address, the manual selection of the corrected location made directly on the geo-referenced image at a particular point on the image, computing geographic coordinates of the corrected location from x,y display coordinates corresponding to the particular point on the image;
   redrawing the map based on the computed geographic coordinates; and
   displaying an indication of the corrected location of the street address in the redrawn map at the computed geographic coordinates.

2. The computer implemented method of claim 1 further comprising:
   displaying another indication of the corrected location of the street address in the georeferenced image.

3. The computer implemented method of claim 1 further comprising:
   performing geographical analysis using the computed geographic coordinates.

4. The computer implemented method of claim 3 wherein the geographical analysis performed is the distance of the street address to a natural hazard.

5. The computer implemented method of claim 4 wherein the natural hazard is a flood zone.

6. The computer implemented method of claim 1, wherein the georeferenced image is displayed beside the map.

7. The computer implemented method of claim 1, wherein the map is overlaid on top of the georeferenced image.

8. The computer implemented method of claim 1, wherein the georeferenced image is an aerial photograph.

9. The computer implemented method of claim 1, wherein the georeferenced image is a satellite image.

10. The computer implemented method of claim 1, wherein the particular point on the image corresponds to a particular selected pixel and wherein computing further comprises:
    converting the location of the selected pixel in the geo-referenced image into the corrected geographic coordinates.

11. The computer implemented method of claim 1, wherein the georeferenced image is a parcel map.

12. The computer implemented method of claim 1, wherein the georeferenced image is a scaled topographical map.

13. An apparatus for interactively modifying geographic coordinates corresponding to a street address comprising:
    a processor; and
    a memory coupled to the processor, wherein the memory comprises program instructions implementing a graphical user interface for interactively modifying the geographic coordinates, wherein the program instructions are executable by the processor for:
    displaying a map representing a geographical area that includes an indication of the location of the street address and a geo-referenced image of the geographical area;
    processing a user input routine that processes selection of a control accepting manual selection by a user of a corrected location of the street address, the manual selection of the corrected location made directly on the geo-referenced image at a particular point on the image;
    processing a mapping routine which computes geographic coordinates of the corrected location from x, y display coordinates corresponding to the particular point on the image, redraws the map based on the computed geographic coordinates and provides an indication of the corrected location of the street address in the map at the computed geographic coordinates.

14. The apparatus of claim 13 wherein the mapping routine provides another indication of the corrected location of the street address in the geo-referenced image at the computed geographic coordinates.

15. The apparatus of claim 13, further comprising:
    a graphical information systems routine which performs geographical analysis using the computed geographic coordinates.

16. The apparatus of claim 15, wherein the geographical analysis performed is the distance of the street address to a natural hazard.

17. The apparatus of claim 16, wherein the natural hazard is a flood zone.

18. The apparatus of claim 13, wherein the georeferenced image is displayed beside the map.

19. The apparatus of claim 13, wherein the map is overlaid on top of the georeferenced image.

20. The apparatus of claim 13, wherein the georeferenced image is an aerial photograph.

21. The apparatus of claim 13, wherein the georeferenced image is a satellite image.

22. The apparatus of claim 13, wherein the particular point on the image corresponds to a particular selected pixel and wherein the mapping routine converts the location of the selected pixel in the geo-referenced image into the corrected geographic coordinates.

23. The apparatus of claim 13, wherein the georeferenced image is a parcel map.

24. The apparatus of claim 13, wherein the georeferenced image is a scaled topographical map.

25. An apparatus for interactively modifying geographic coordinates corresponding to a street address comprising:
    a processor; and
    a memory coupled to the processor, wherein the memory comprises:
    means for displaying a map representing of a geographical area that includes an indication of the location of the street address and a geo-referenced image of the geographical area;
    means for processing selection of a control accepting manual selection by a user of a corrected location of the street address, the manual selection of the corrected location made directly on the geo-referenced image at a particular point on the image;
    means for computing geographic coordinates of the corrected location from x, y display coordinates corresponding to the particular point on the image;

means for redrawing the map based on the computed geographic coordinates; and means for displaying an indication of the corrected location of the street address in the map at the computed geographic coordinates.

26. A computer program product, for interactively modifying geographic coordinates corresponding to a street address, the computer program product comprising a readable memory device having computer readable program code stored thereon, including program code which, when executed, causes one or more processors to perform the steps of:

displaying a map representing a geographical area that includes an indication of the location of the street address;

displaying a geo-referenced image of the geographical area represented by the map;

processing selection of a control accepting manual selection by a user of a corrected location of the street address, the manual selection of the corrected location made directly on the geo-referenced image at a particular point on the image;

computing geographic coordinates of the corrected location from x, y display coordinates corresponding to the particular point on the image;

redrawing the map based on the computed geographic coordinates; and displaying an indication of the corrected location of the street address in the map at the computed geographic coordinates.

\* \* \* \* \*

UNITED STATES PATENT AND TRADEMARK OFFICE
CERTIFICATE OF CORRECTION

PATENT NO. : 7,636,901 B2  Page 1 of 1
APPLICATION NO. : 10/877060
DATED : December 22, 2009
INVENTOR(S) : Munson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Ninth Day of November, 2010

David J. Kappos
*Director of the United States Patent and Trademark Office*